(12) United States Patent
Palmer

(10) Patent No.: US 8,234,258 B2
(45) Date of Patent: *Jul. 31, 2012

(54) IDENTIFYING AND PROCESSING CONFIDENTIAL INFORMATION ON NETWORK ENDPOINTS

(75) Inventor: Matthew Palmer, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,585

(22) Filed: Jun. 7, 2010

(65) Prior Publication Data

US 2010/0250514 A1    Sep. 30, 2010

Related U.S. Application Data

(63) Continuation of application No. 11/420,275, filed on May 25, 2006, now Pat. No. 7,756,843.

(51) Int. Cl.
*G06F 17/30* (2006.01)

(52) U.S. Cl. ......... 707/694; 707/708; 707/728; 707/783

(58) Field of Classification Search .................. 707/706, 707/707, 714, 737, 694, 783; 726/26; 70/707
See application file for complete search history.

(56) References Cited

U.S. PATENT DOCUMENTS

| | | | |
|---|---|---|---|
| 6,425,126 B1 * | 7/2002 | Branson et al. | 717/168 |
| 6,618,721 B1 * | 9/2003 | Lee | 726/26 |
| 7,016,895 B2 | 3/2006 | Dehlinger et al. | |
| 7,203,737 B2 | 4/2007 | Starbuck et al. | |
| 2004/0015485 A1 * | 1/2004 | Salerno et al. | 707/3 |
| 2004/0068661 A1 | 4/2004 | Dettinger et al. | |
| 2004/0225645 A1 | 11/2004 | Rowney et al. | |
| 2005/0076023 A1 | 4/2005 | Wu et al. | |
| 2005/0091524 A1 | 4/2005 | Abe et al. | |
| 2005/0108518 A1 * | 5/2005 | Pandya | 713/151 |
| 2005/0160083 A1 * | 7/2005 | Robinson | 707/3 |
| 2006/0161856 A1 * | 7/2006 | Heir | 715/769 |
| 2006/0272024 A1 | 11/2006 | Huang et al. | |
| 2007/0027880 A1 | 2/2007 | Dettinger et al. | |
| 2007/0083498 A1 | 4/2007 | Byrne et al. | |
| 2007/0156897 A1 * | 7/2007 | Lim | 709/225 |
| 2007/0162417 A1 | 7/2007 | Cozianu et al. | |
| 2007/0180258 A1 * | 8/2007 | Broussard et al. | 713/182 |
| 2007/0239639 A1 | 10/2007 | Loughmiller et al. | |
| 2007/0261099 A1 * | 11/2007 | Broussard et al. | 726/1 |
| 2007/0271255 A1 * | 11/2007 | Pappo | 707/5 |

OTHER PUBLICATIONS

Co-pending U.S. Appl. No. 11/420,275, filed May 25, 2006 entitled "Identifying and Processing Confidential Information on Network Endpoints" by Matthew Palmer, 38 pages.

* cited by examiner

*Primary Examiner* — Sherief Badawi
(74) *Attorney, Agent, or Firm* — Harrity & Harrity, LLP

(57) ABSTRACT

An automated method for identifying confidential information may include inputting a search term based on a set of policy rules into a search engine, and causing the search engine to perform a search based on the search term. The method may also include analyzing search results obtained from the search engine against the policy rules to identify the search results containing confidential information.

16 Claims, 9 Drawing Sheets

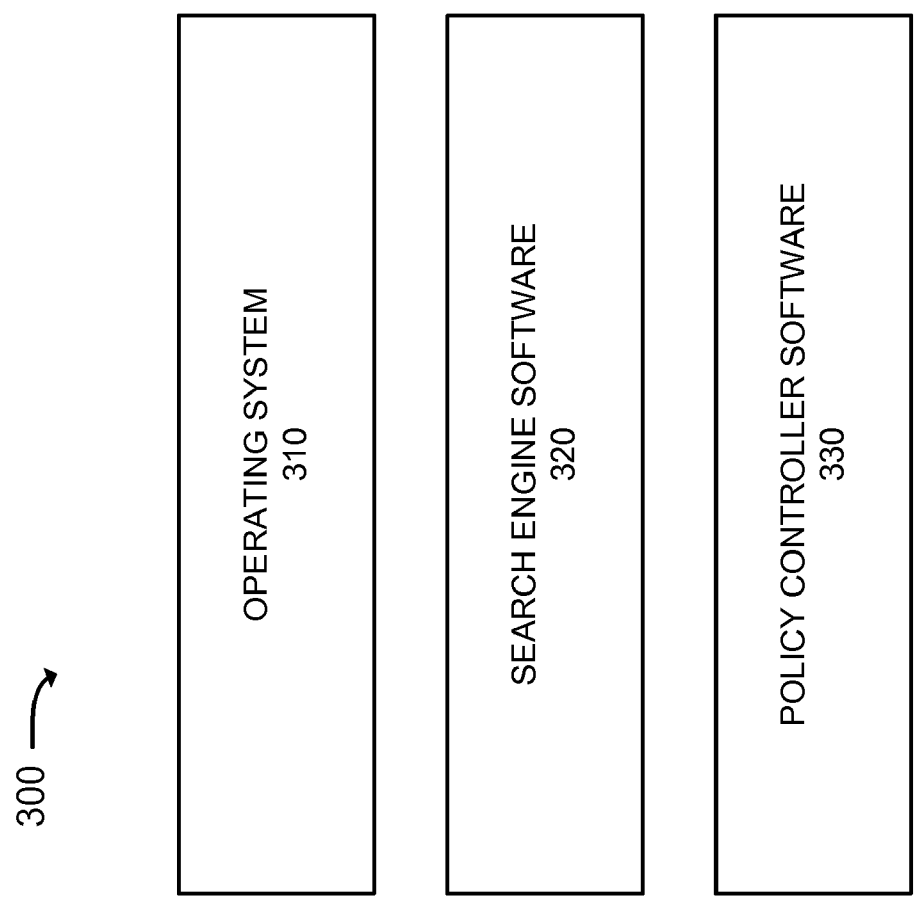

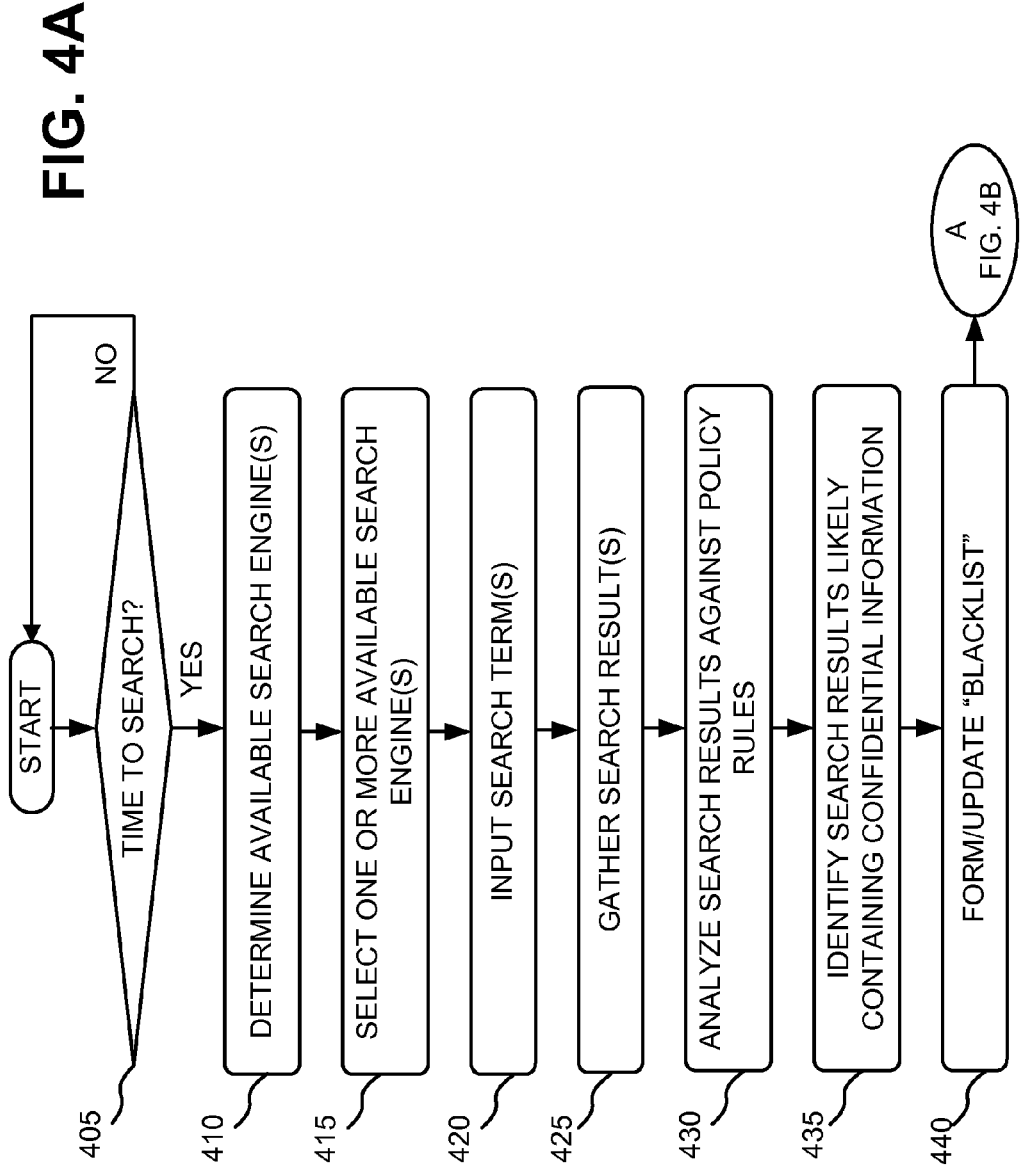

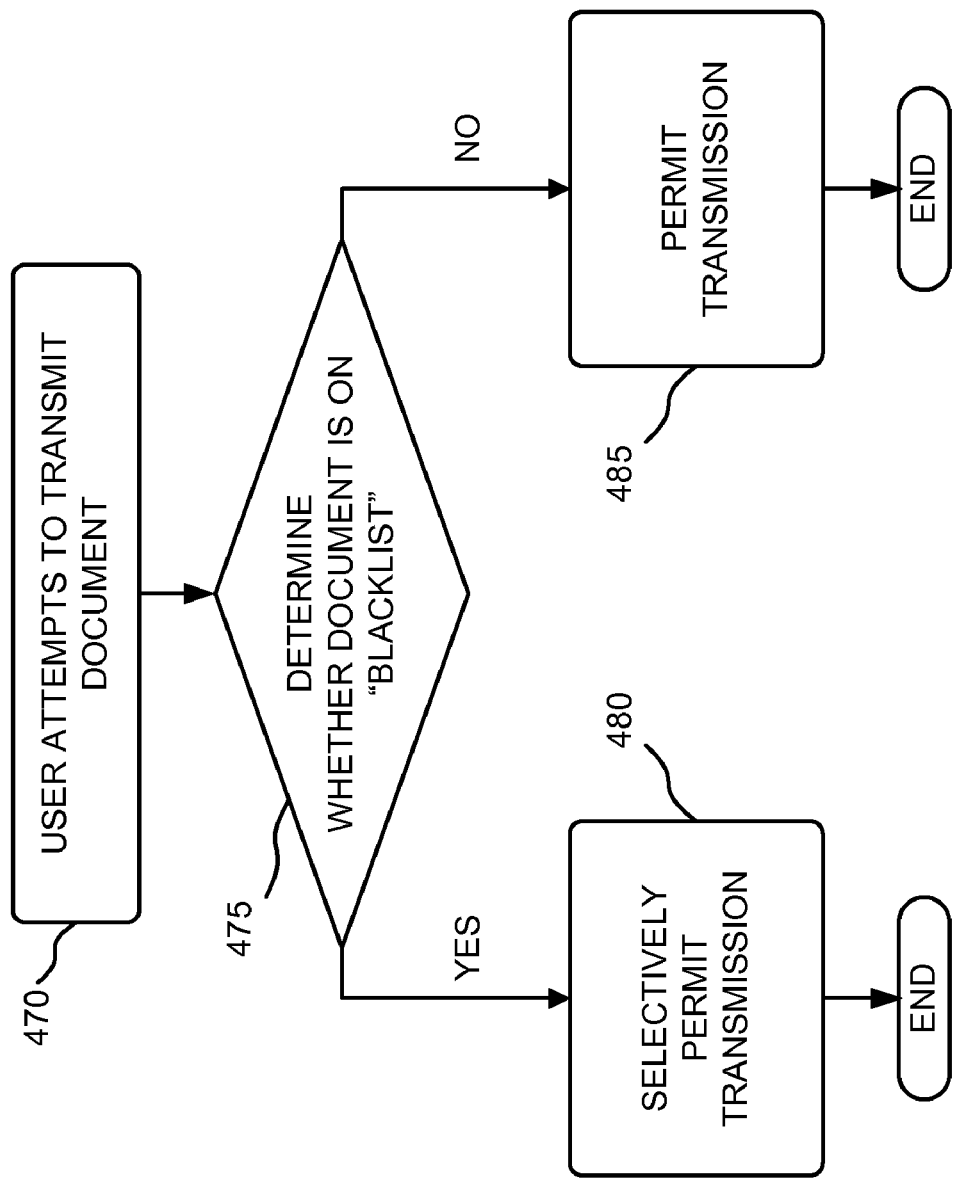

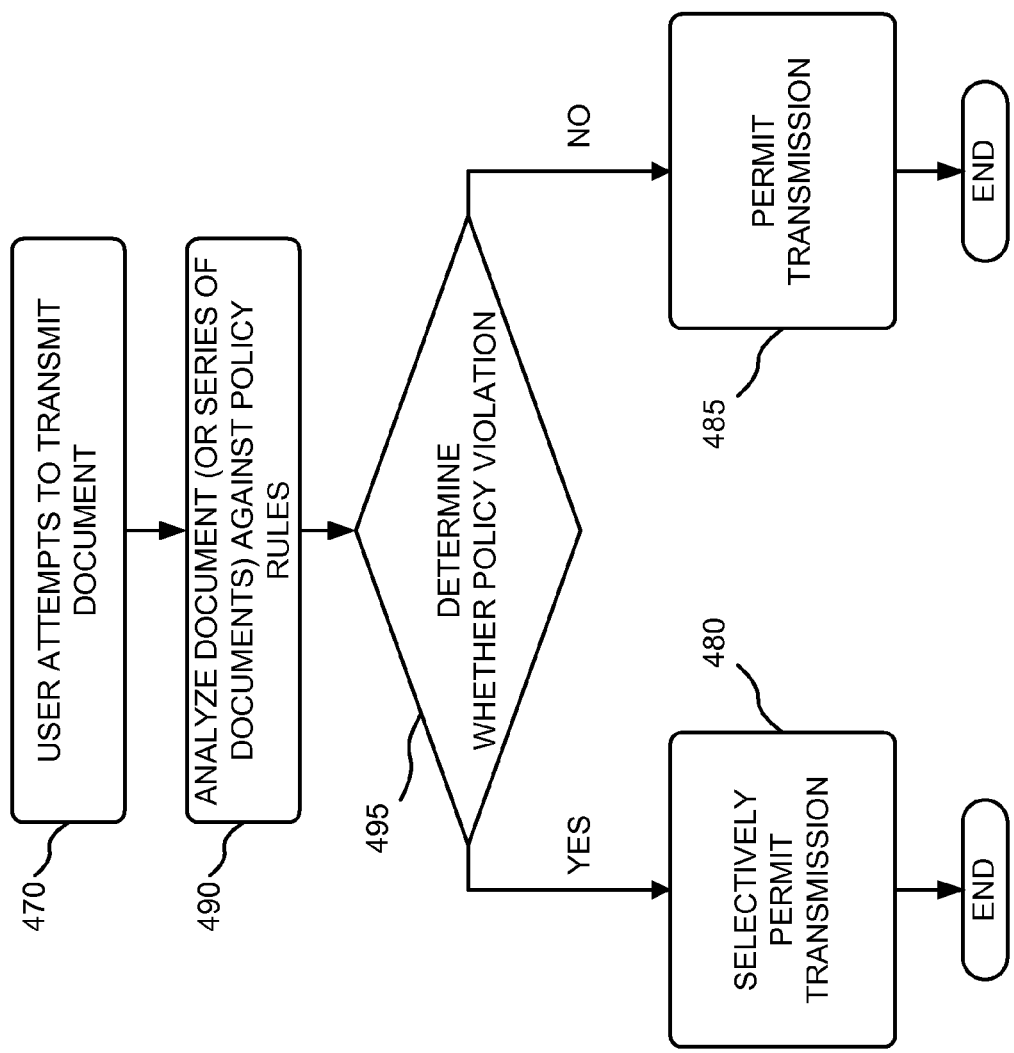

IDENTIFYING AND PROCESSING CONFIDENTIAL INFORMATION ON NETWORK ENDPOINTS

RELATED APPLICATION

This application is a continuation of U.S. patent application Ser. No. 11/420,275 filed May 25, 2006, which is incorporated herein by reference.

BACKGROUND

1. Field of the Invention

Implementations consistent with the principles of the invention relate generally to data processing and, more particularly, to identifying and processing confidential information on network endpoints.

2. Description of Related Art

Organizations are continuously looking to prevent information leakage from their internal networks and endpoints (e.g., devices connected to the networks). Information leakage may include sending confidential information from people legitimately using a network or endpoint to people outside of the organization. This is a problem for organizations due to increasing internal and external compliance requirements, the need to protect intellectual property, and the need to prevent unauthorized disclosure of sensitive information.

Some organizations use firewalls that block content based upon information stored in a policy server that is deemed to be confidential. Such systems are difficult to update because the confidential information to be blocked by the firewall needs to be manually entered into the policy server. Manual policy entry is time consuming and may disclose confidential information to people in the organization who should not have access to such information.

Some organizations use proprietary custom search engines that work in conjunction with a policy server to search specific devices connected to the organizational network. However, such arrangements only work well if the information being searched does not change and information is stored in appropriate locations accessible to the organizational network. Such arrangements do not work if information is stored locally on a network endpoint (e.g., on a hard drive of a laptop) because the network server(s) may be unaware of such information. The network server(s) also cannot retrieve such information unless the user of the local information decides to disclose such information to the network server(s). The arrangements also fail to prevent a network endpoint from sending confidential information outside of the network control via external networks (e.g., emailing confidential information via the Internet from a non-corporate email account to a personal email account, e.g., hotmail account). Furthermore, the custom search engines of these systems provide inaccurate results.

SUMMARY

According to one aspect, a computer-readable medium may store computer-executable code for identifying confidential information. The code may include instructions to determine the availability of a search engine or search engines, instructions to select a search engine from the available search engines. The code may also include instructions to input a search term based on a set of policy rules into the selected search engine and cause the selected search engine to perform a search based on the search term. The code may further include instructions to analyze the search results obtained from the selected search engine against the policy rules, and instructions to identify the search results as containing confidential information based on analyzing the search results against the policy rules.

According to another aspect, a device for identifying confidential information may include a memory and a processor connected to the memory. The processor may be configured to identify a search engine from available search engines, input a search term based on a set of policy rules into the identified search engine and cause the identified search engine to perform a search based on the search term, and identify search results obtained from the identified search engine that contain confidential information based on the policy rules.

According to yet another aspect, an automated method for identifying confidential information may include inputting a search term based on a set of policy rules into a search engine, causing the search engine to perform a search based on the search term, and analyzing search results obtained from the search engine against the policy rules to identify the search results containing confidential information.

According to yet another aspect, a system for identifying confidential information may include means for selecting a search engine from the available search engines, means for inputting a search term based on a set of policy rules into the selected search engine, and means for analyzing search results obtained from the selected search engine against the policy rules to identify the search results containing confidential information.

According to still a further aspect, a computer-readable medium may store computer-executable code for processing a document. The code may include instructions to identify a document that a user is attempting to transmit, instructions to determine that the document contains confidential information, and instructions to selectively permit transmission of the document.

According to still another aspect, a computer-readable medium may store computer-executable code for processing a document identified using a search engine and search terms based on a set of policy rules. The code may include instructions to identify a document that a user is attempting to transmit, instructions to determine whether the document violates the policy rules, and instructions to selectively permit transmission of the document if the document violates the policy rules and permit transmission if the document complies with the policy rules.

According to another aspect, a system for processing confidential information may include a rule generator to receive confidential information from a plurality of devices that identify the confidential information using a search engine and search terms based on a set of policy rules. The rule generator may also create updated policy rules based on the confidential information received from the devices. The system may further include a policy server to receive the updated policy rules from the rule generator, and send the updated policy rules to the devices.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a diagram of a portion of an exemplary computer-readable medium that may be used by the device of FIG. 2;

FIGS. 4A-4D provide a flowchart of an exemplary operation for processing confidential information according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention relate to identifying and processing confidential information stored on network endpoints. As used herein, the term "network endpoint" refers to any device capable of connecting to a network via wired, wireless, and/or optical connections. Instead of using a proprietary content filtering engine and building a large software platform to download to network endpoints, an implementation consistent with the principles of the invention may provide network endpoint software that searches for and identifies confidential information using one or more desktop search engine software packages. The search results may be used to prevent leakage of confidential information from a specific network endpoint, and to educate the network to prevent other network endpoints from disclosing the same or similar confidential information.

Exemplary Network

Figure 1:
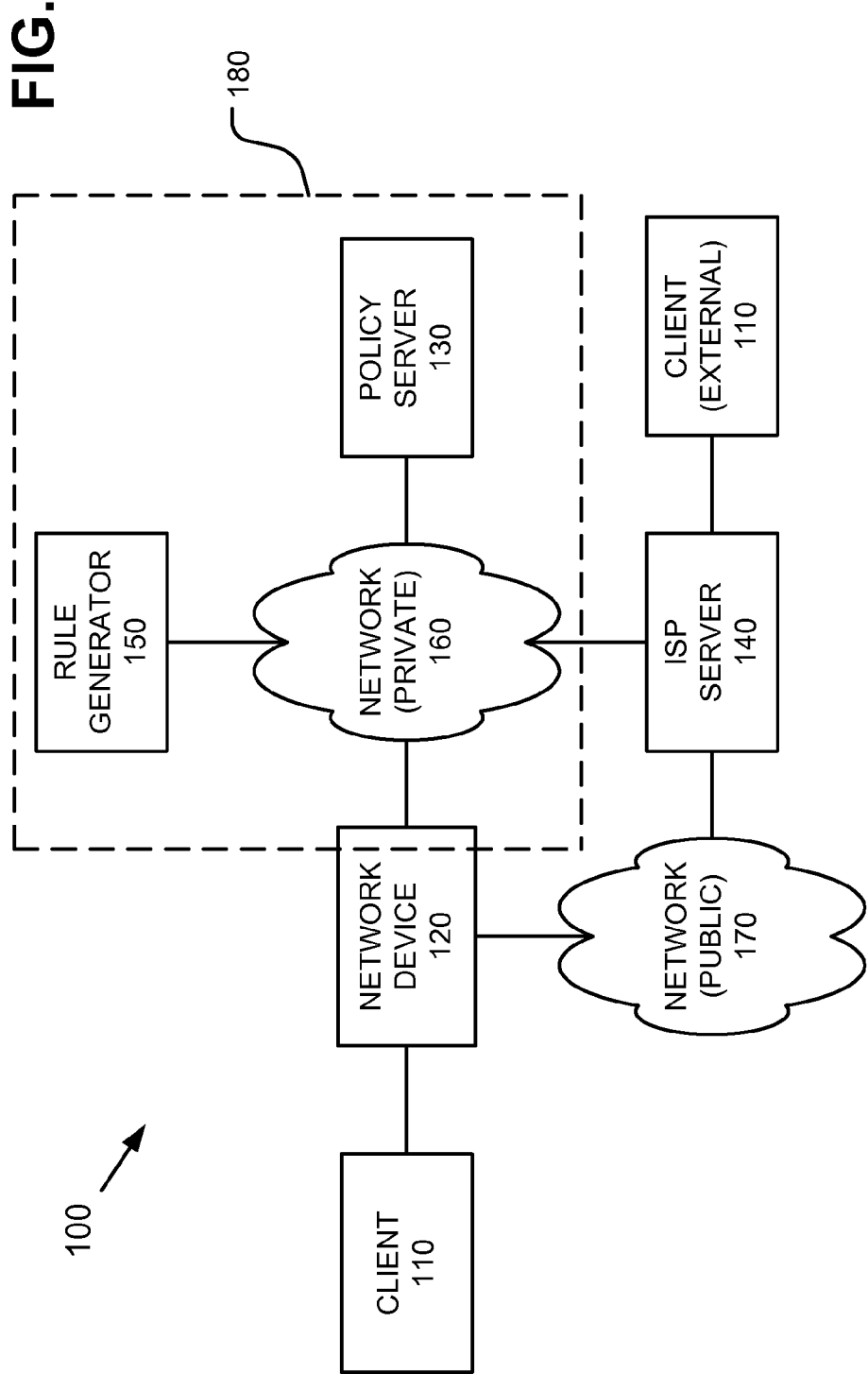
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include a client 110, a network device 120, a policy server 130, an Internet Service Provider (ISP) server 140, a rule generator 150, a private network 160, and a public network 170. Two clients 110, and a single network device 120, policy server 130, and ISP server 140 have been illustrated in FIG. 1 for simplicity. In practice, there may be more clients 110, network devices 120, policy servers 130, and/or ISP servers 140. Also, in some instances, client 110 may perform a function of a server 130/140 and/or a server 130/140 may perform a function of client 110.

As shown in FIG. 1, client 110 may connect to private network 160 via network device 120. Policy server 130 and rule generator 150 may connect to network device 120 via private network 160. Private network 160 may include a local area network (LAN), a private network, such as a company intranet, or another type of network. Private network 160 may also include organizational components, devices, servers, etc. (not shown in FIG. 1). Client 110 may connect to public network 170 via network device 120. ISP server 140 and other external client(s) 110 may connect to network device 120 via public network 170. Public network 170 may include a wide area network (WAN), a telephone network, such as the Public Switched Telephone Network (PSTN), the Internet, or a combination of networks.

Client 110 and servers 130/140 may each include a device, such as a personal computer, a wireless telephone, a personal digital assistant (PDA), a lap top, or another type of computation or communication device, or a process running on one of these devices. In one implementation, client 110 and/or servers 130/140 may take the form of a provider of network content, such as a file, a web page, an email, or an instant message.

Network device 120 may include a data transfer device, such as a gateway, a router, a switch, a firewall, a bridge, a proxy server, or some other type of device that processes and/or transfers data. In one implementation, network device 120 may operate on data on behalf of an organizational network, such as organizational network 180. For example, network device 120 may receive all, or substantially all, data destined for organizational network 180 and/or transmitted by organizational network 180.

Policy server 130 may include a server, or a set of servers, that contain policy information. Policy information may include, for example, a condition for a user/application system to access a resource. The policy information may be parsed into policy rules having the following general format: if (condition) then (action). Policy rules may be set to prevent confidential information from being distributed outside of organizational network 180 or within organizational network 180 (e.g., to users not authorized to view such confidential information). "Confidential information" may take the form of a document that contains private information (e.g., word(s), document type, document name(s), file(s), code name(s), a string of characters (e.g., a credit card number, a social security number, an address, etc.)), inappropriate content (e.g., profanity, pornography, etc.), detrimental content (e.g., viruses, spyware, etc.), and/or anything else that violates the policy rules of an organization. Policy rules may include rules that particular information cannot be sent outside the organizational network or that certain information cannot be downloaded to a client on the organizational network.

A "document," as the term is used herein, is to be broadly interpreted to include an application, a program, an email, a portion of an email, a series of emails, an instant message, a portion of an instant message, a series of instant messages, a file, a portion of a file, a combination of files, combinations of any of the aforementioned, etc.

Policy server 130 may cause one or more operations to be performed by client 110 based on policy rules. Client 110 may operate a policy rule client process that may interact with a policy rule server process operating on policy server 130. Generally, client 110 may perform a service, such as check for confidential information violating a policy rule, with regard to a document contained on client 110. Client 110 may perform the service and provide the results to policy server 130. Client 110 may use the results in determining, for example, whether to permit the document to be transmitted from client 110.

Organizational network 180 may include a rule generator 150 that collects information from organizational network 180 and provides this information as training data to a model. The model may generate new policy rules and/or modify existing policy rules ("updated policy rules") based upon the training data, and send the updated policy rules to policy server 130. Rule generator 150 may be part of policy server 130 or another device provided in private network 160 of organizational network 180.

Exemplary Device Architecture

Figure 2:
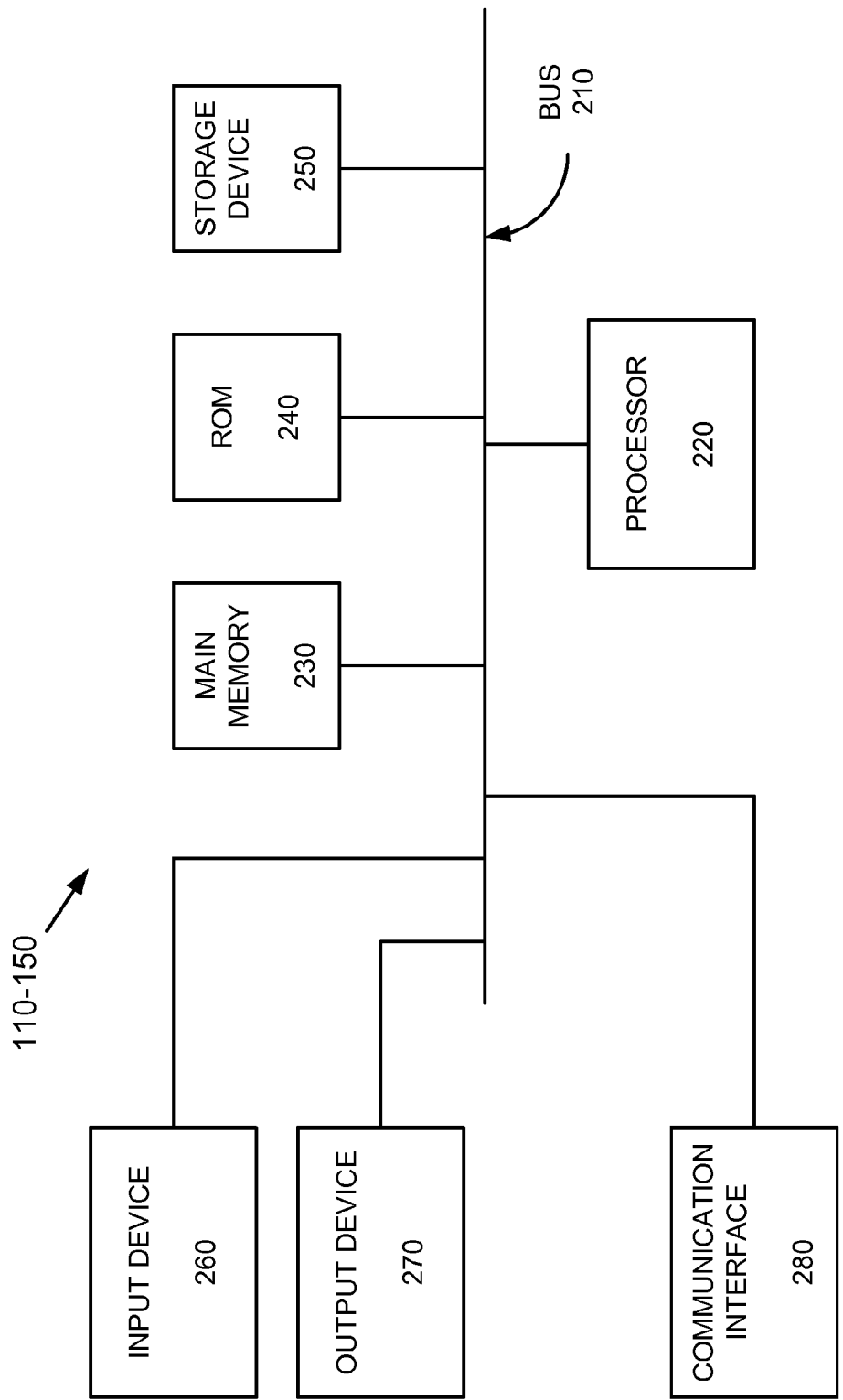
FIG. 2 is an exemplary block diagram of a device that may correspond to a client, network device, and/or server of FIG. 1.

FIG. 2 is an exemplary block diagram of a device, which may correspond to client 110, network device 120, policy server 130, ISP server 140, and/or rule generator 150. The device may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

The device, consistent with the principles of the invention, may perform certain operations, as described in detail below. The device may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

FIG. 3 is a diagram of a portion of an exemplary computer-readable medium 300 that may be used by a device, such as the device of FIG. 2. In one implementation, computer-readable medium 300 may correspond to memory 230 of client 110. The portion of computer-readable medium 300 illustrated in FIG. 3 may include an operating system 310, search engine software 320, and/or policy controller software 330. Software 320/330 may be included in operating system 310 or may be separate from operating system 310.

Operating system 310 may include operating system software, such as the Microsoft Windows®, Apple MAC OS®, Linux®, Unix®, or IBM OS/2® operating systems, or an operating system for a personal digital assistant, a cell phone, or another type of communication device.

Search engine software 320 may include any desktop search software, such as Google™ Desktop Search, Yahoo!® Desktop Search, Windows® Desktop Search, Apple® Spotlight, Copernic® Desktop Search, and/or desktop search software available from AOL®, Lycos®, AskJeeves®, Blinkx, Intellext, X1 Technologies, and Autonomy. Desktop search software differs from web-based search engines in the types of applications they support, but basically works in the same manner as web-based counterparts. Desktop search software may scan the contents of local and/or network-connected memory devices and build an index of the information by keyword or phrase. For example, the desktop search software may permit the contents of email, webmail, instant messages, and/or documents to be searched.

Policy controller software 330 may include an executable object or process. Client 110 may obtain the executable object or process from a server (e.g., policy server 130 or a server connected to network 160) or from a third party, such as a third party server, disk, tape, network, CD-ROM, etc. Alternatively, the executable object or process may be pre-installed on client 110.

If policy controller software 330 is not installed on client 110, then software 330 may be automatically installed on client 110 when client 110 attempts to connect to organizational network 180, and organizational network 180 recognizes that software 330 is not installed on client 110. Software 330 may be updated by organizational network 180 in a similar manner if organizational network 180 recognizes that software 330 is outdated.

Policy controller software 330 may provide a searching aspect, an updating aspect, and an enforcement aspect. In the searching aspect, policy controller software 330 may select a search engine(s) from available search engine software 320, instruct the search engine(s) to search for confidential information, and/or analyze the results of the search. In the updating aspect, policy controller software 330 may determine if the search result(s) are on a "blacklist" of confidential information, and/or utilize the search results to update the policy rules. In the enforcement aspect, policy control software 330 may determine whether a document is on the "blacklist" of confidential information, analyze a new document to see if it violates the policy rules, and/or control transmission of any confidential information.

Policy controller software 330 may be automatically activated upon initiation of the operating system. Policy controller software 330 may also be automatically activated when client 110 attempts to connect to a network device 120, or when client 110 attempts to transmit information to a network, such as network 170, or to a removable media (e.g., ROM device, static storage device, a magnetic and/or optical recording medium). Alternatively, policy controller software 330 may be activated when instructed by a user. In any case, policy controller software 330 may identify and process confidential information, as will be described below.

Exemplary Processing

FIGS. 4A-4D provide a flowchart of an exemplary operation for identifying and processing confidential information located on network endpoints according to an implementation consistent with the principles of the invention. The processing of FIGS. 4A-4D may begin upon initiation of the operating system of client 110, when client 110 attempts to connect to a network device 120, when client 110 attempts to transmit information to a network or removable media, or when instructed by a user of client 110. In one implementation, the processing of FIGS. 4A-4D may be performed by one or more software and/or hardware components within client 110, policy server 130, and/or rule generator 150. In another implementation, the processing may be performed by one or more software and/or hardware components within another device or a group of devices separate from or including client 110, policy server 130, and/or rule generator 150.

FIG. 4A shows the searching aspect in accordance with an implementation of the invention. As shown, policy controller software 330 may decide whether it is time to search client 110 (block 405). The timing of a search may be set at any interval and/or event, e.g., when a user stops typing, attempts to connect to organizational network 180, closes an application, at predetermined time intervals, etc. Policy controller software 330 may determine what search engine(s) are available on client 110 (block 410). For example, software 330 may examine search engine software 320. Software 330 may download and/or install search engine software if no such software is available on client 110 or if additional search engine software is desired. Policy controller software 330 may select one or more available search engine software packages from search engine software 320 (block 415). For example, software 330 may select a search engine software package from within any of the search engine software 320 discussed above, and may choose more than one search engine software package, if multiple search engines are available on client 110.

Policy controller software 330 may input search term(s) into the selected search engine(s) (block 420). For example, software 330 may input search term(s) based, for example, on information received from policy server 130 and cause the search engine(s) to perform a search based on the search term(s). The inputting of search term(s) and performance of a search may be repeated for different search term(s). Policy controller software 330 may gather the search result(s) (block 425). For example, software 330 may gather search result(s) from each search that is performed.

As further shown in FIG. 4A, after the search engine(s) conducts a search, policy controller software 330 may analyze the search result(s) against the policy rules (block 430). For example, software 330 may determine whether any of the search result(s) violates the policy rules (e.g., software 330 may determine the probability that the search result(s) includes confidential information). Policy controller software 330 may identify the search result(s) that likely contain confidential information based on the analysis against the policy rules (block 435). For example, software 330 may score search result(s) based on the policy rules. Software 330 may determine a confidence level that the search result(s) contains confidential information. Software 330 may set the confidence level based, for example, on the number of times a search term appears in a document and set a threshold at which the confidence level may exceed before the document is deemed to be "blacklisted". The threshold may be set low to be extra cautious. "Blacklist" or "blacklisted" material may include any document that an organization deems to contain confidential information.

Policy controller software 330 may create and/or update the "blacklist" of results that may contain confidential information (block 440). For example, software 330 may create a "blacklist" from the search result(s) and/or supplement an existing "blacklist." A "blacklist" may take the form of a listing of document(s) that have been determined to contain confidential information.

Figure 4B:
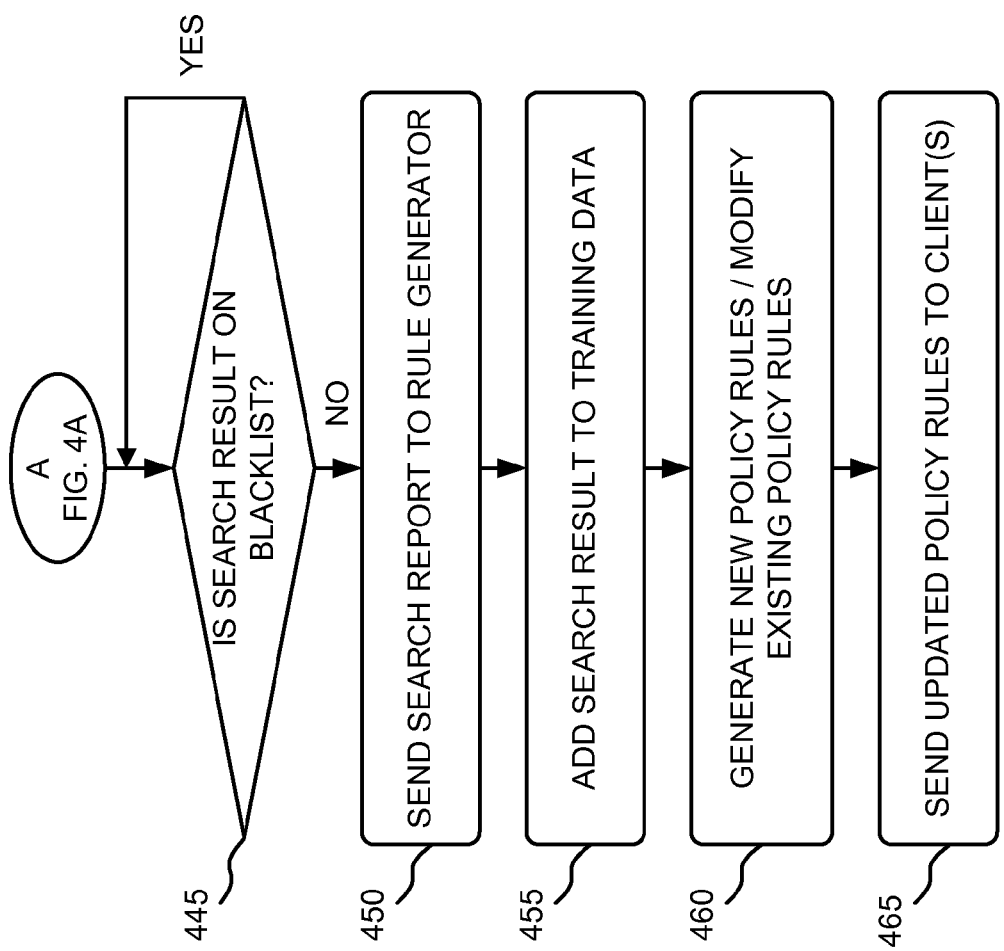

FIG. 4B shows the updating aspect in accordance with an implementation of the invention. As shown, policy controller software 330 may determine whether a search result is listed on the "blacklist." If the search result is already listed on the "blacklist" (block 445—YES), then software 330 may check other search results. The updating aspect for such a search result need not occur because it is already known by organizational network 180.

If the search result is not listed on the "blacklist" (block 445—NO), then, software 330 may send the search result(s) to rule generator 150 (block 450). This may occur at any time interval, e.g., the next time client 110 connects to organizational network 180. Rule generator 150 may receive the search result, analyze the information contained in the search result (e.g., provide the information as training data to a model) (block 455), and generate new policy rules and/or modify existing policy rules ("updated policy rules") based on the new information (block 460). Rule generator 150 may transmit the updated policy rules to policy server 130. Client 110 may receive the updated policy rules from policy server 130 (block 465). Policy server 130 may decide whether to provide the updated policy rules to other clients 110 connected to organizational network 180 (block 465). Transmission of the updated policy rules by policy server 130 may occur at any time interval, e.g., the next time a client connects to organizational network 180.

In another implementation, policy controller software 330 may generate new policy rules and/or modify existing policy rules itself. For example, software 330 may add the search result(s) to its own training data (e.g., to train its model to generate new policy rules and/or modify existing policy rules ("updated policy rules") based on any new information). In this case, policy controller software 330 may send the updated policy rules to other client(s) 110. For example, software 330 may transmit the updated policy rules to policy server 130 for distribution to other clients 110 of organizational network 180. Alternatively, software 330 may send the updated policy rules to the other clients 110 itself.

FIG. 4C shows the enforcement aspect in accordance with an implementation of the invention. As shown, if a client 110 attempts to transmit a document (block 470), then policy controller software 330 may determine whether the document is on the "blacklist" (block 475). "Transmit" or "transmission" of content may include any form of transmission, such as via email, via instant message, as an attachment to email and/or instant message, computer-computer transfer, storage to an external/removable memory, printing to a printer, etc. If the document is on the "blacklist" (block 475—YES), then policy controller software 330 may selectively permit transmission of the document (block 480). For example, software 330 may completely block transmission of the document by preventing transmission of the document throughout an organization and/or outside an organization. Software 330 may also put restrictions on the use of the document. For example, software 330 may preclude transmission of the document to certain individuals, or allow the document to be transmitted within the entire organization, but preclude transmission outside the organization. In one implementation, if the user is attempting to transmit the document within organizational network 180, the transmission may be permitted depending upon to whom the user is transmitting the document. Otherwise, software 330 may block transmission of the document.

Software 330 may also provide information to the user about the reason for blocking the transmission. For example, software 330 may inform the user about what is happening to the document (e.g., blocked, quarantined, deleted, etc.). Software 330 may also inform the user how to legitimately distribute the document (e.g., may only send to certain users, may only use internally, etc.). Software 330 may also notify organizational network 180 of this violation. This would enable organizational network 180 to pinpoint potential policy violations and have a record of such violations.

As further shown in FIG. 4C, if the document is not on the "blacklist" (block 475—NO), then policy controller software 330 may permit transmission of the document (block 485). Software 330 may allow use of the document because it does not contain confidential information, and may permit transmission of the document throughout an organization and/or outside an organization.

FIG. 4D shows another implementation of the enforcement aspect. As shown, if a client 110 attempts to transmit a document (block 470), then policy controller software 330 may analyze the document (or series of documents) against the policy rules (block 490). Analysis of a series of documents is intended to prevent transmission of confidential information that is contained in multiple documents (e.g., multiple emails or instant messages), where each single document would not violate the policy rules, but the documents together would violate the policy rules. For example, software 330 may analyze the document (and/or series of documents) to see if they contain confidential information alone and/or in combination.

Policy controller software 330 may determine whether there is a policy violation (block 495). For example, software 330 may determine whether the information contained in the document(s) violates the policy rules (e.g., whether the probability of the document(s) including confidential information exceeds a predetermined threshold). If the document(s) violates the policy rules (block 495—YES), then policy controller software 330 may selectively permit transmission of the document (block 480), as discussed above for FIG. 4C. If the document(s) does not violate the policy rules (block 495—NO), then policy controller software 330 may permit transmission of the document (block 485), as discussed above for FIG. 4C.

While the implementations shown in FIGS. 4C and 4D are shown as separate implementations, these implementations may be combined into a single implementation.

EXAMPLES

Figure 5:
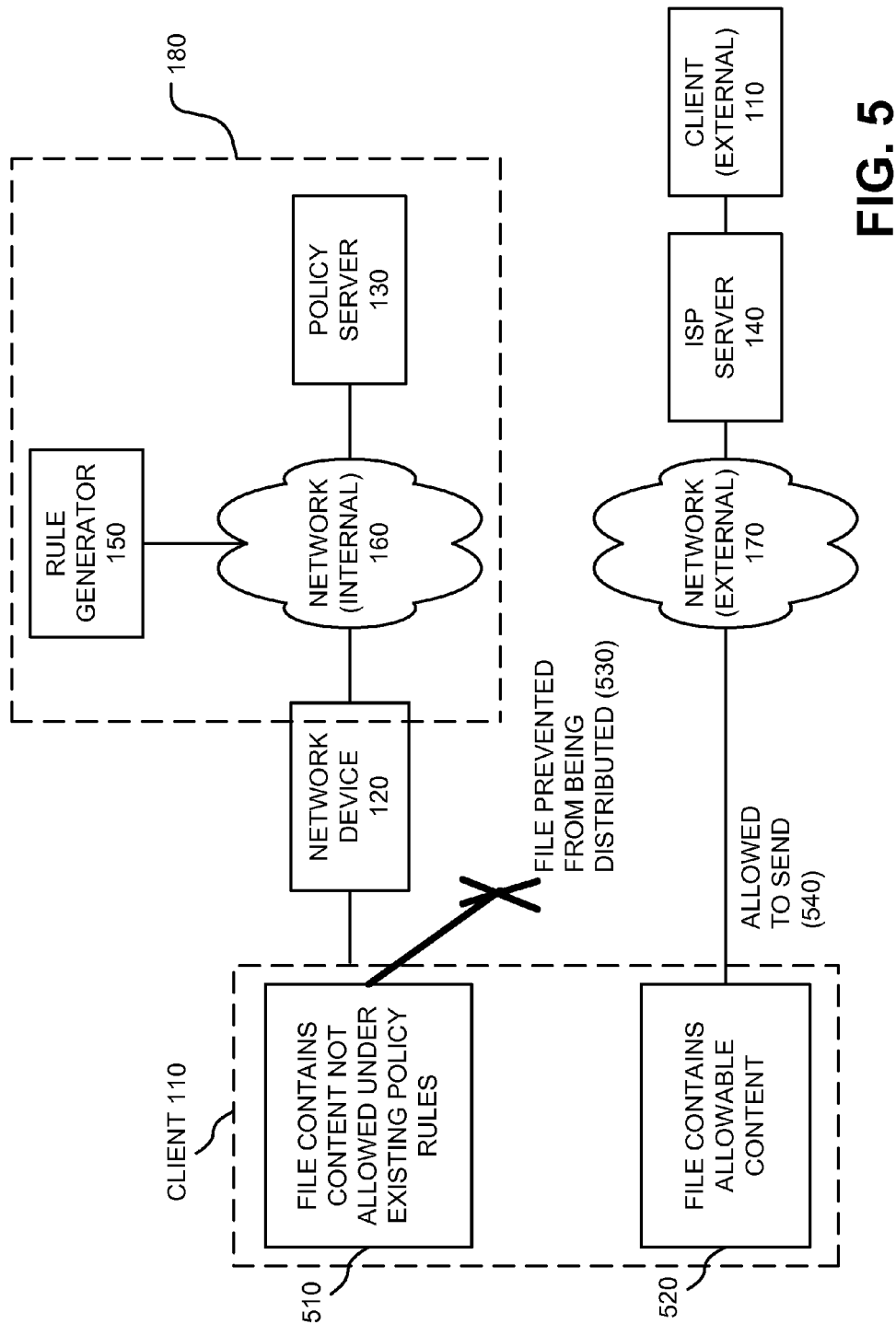
FIGS. 5 and 6 are diagrams of exemplary implementations consistent with the principles of the invention.
Figure 6:
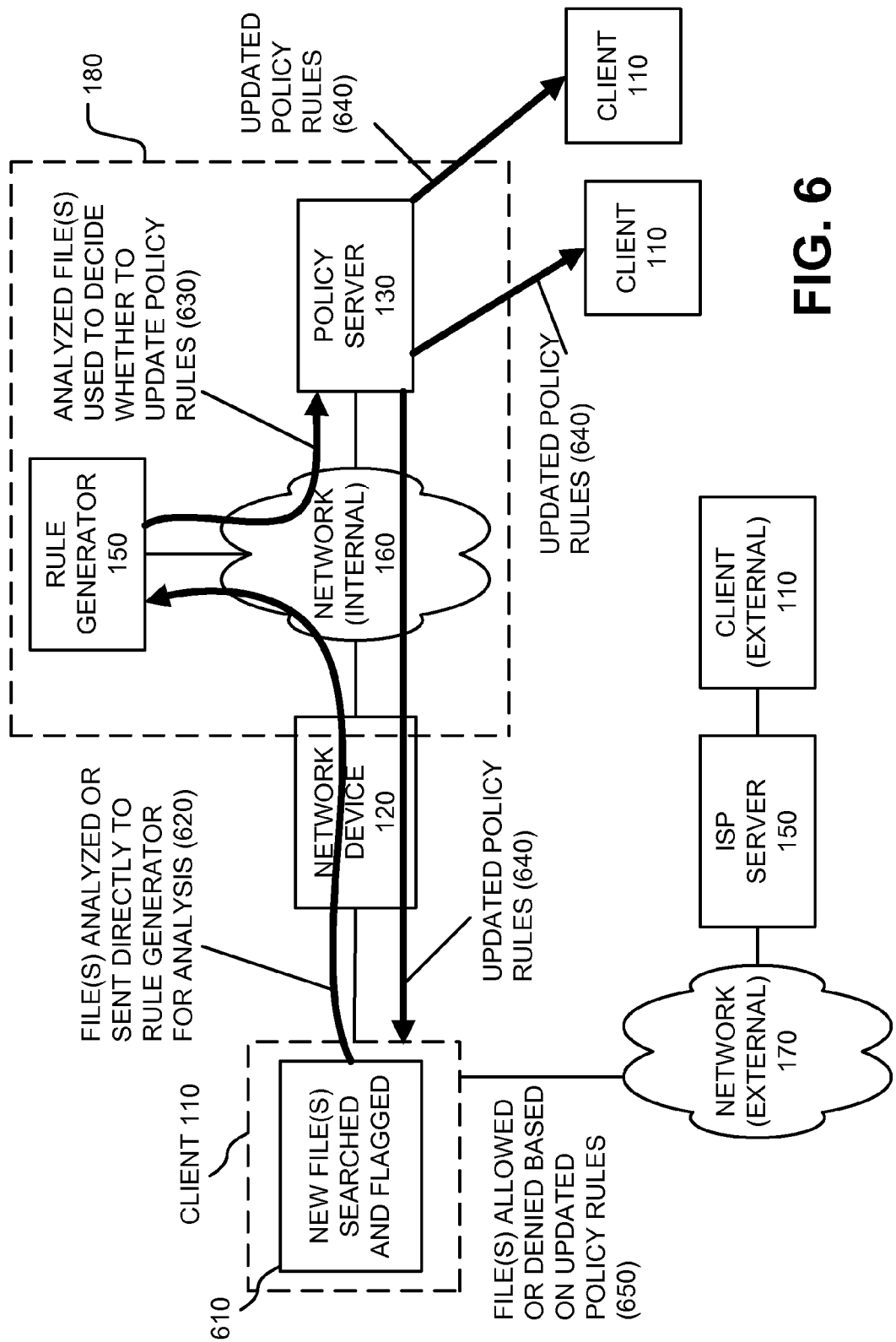

There are a number of ways to implement the aspects of the present invention. FIGS. 5 and 6 are diagrams of a few exemplary implementations for providing network endpoint software that identifies and processes confidential information using one or more desktop search engine software packages. The search results may be used to prevent leakage of confidential information from a specific network endpoint, and to educate the network so as to prevent other network endpoints from transmitting the same or similar confidential information.

Policy Enforcement

FIG. 5 is a diagram of an exemplary implementation for performing the enforcement aspect in an exemplary network 500. Network 500 may include client 110 connected to organizational network 180 via network device 120. Organizational network 180 may include policy server 130 and rule generator 150 connected to private network 160. Client 110 may also be connected to ISP server 140 and external client 110 via public network 170.

Client 110 may have a file 510 that contains content not allowed under existing policy rules, and a file 520 that contains allowable content under existing policy rules. Both files 510, 520 may be processed in accordance with the aspects of FIG. 4C to determine whether transmission of files 510, 520 should be permitted or selectively permitted. In accordance with FIG. 4C, file 510 may be prevented from being transmitted outside the organizational network 180 (i.e., blocked) because it violates policy rules (530). File 510 may also be flagged (and organizational network 180 notified), be prevented from being transmitted within organizational network 180, and/or have other restrictions placed upon it. Further in accordance with FIG. 4C, file 520 may be transmitted within and/or outside the organizational network (540) because it does not violate policy rules.

File 510 may be further processed. For example, the user of client 110 may be informed what is happening to file 510 (e.g., blocked, quarantined, deleted, etc.). The user of client 110 may be informed how to legitimately distribute file 510 (e.g., may only send to certain users, may only use internally, etc.).

Searching, Policy Updating, and Policy Enforcement

FIG. 6 is a diagram of an exemplary implementation for performing the searching, updating, and enforcement aspects in an exemplary network 600. Network 600 may include client 110 connected to organizational network 180 via network device 120. Organizational network 180 may include policy server 130 and rule generator 150 connected to private network 160. Client 110 may also be connected to ISP server 140 and external client 110 via public network 170.

Client 110 may have a file or files 610 that were located in a search of client 110 in accordance with the aspects of FIG. 4A. For example, file(s) 610 may have been located on client 110 by selecting a search engine(s) on client 110 (block 415 of FIG. 4A); by choosing search terms based on policy rules (block 420 of FIG. 4A); by analyzing the search result(s) against policy rules (block 430 of FIG. 4A); and/or by identifying search result(s) likely containing confidential information (block 435 of FIG. 4A).

File(s) 610 may be processed in accordance with the aspects of FIG. 4B. For example, it may be determined whether file(s) 610 are on the "blacklist" (block 445 of FIG. 4B). File(s) 610 retrieved after this process may be analyzed directly by policy controller software 330 or may be sent to rule generator 150 for analysis (620). Software 330 and/or rule generator 150 may use file(s) 610 as training data (block 455 of FIG. 4B) to generate new policy rules and/or modify existing policy rules (block 460 of FIG. 4B).

Rule generator 150 may receive file(s) 610 and use them as training data for, e.g., a model, that decides whether and how to update policy rules. In one implementation, rule generator 150 may collect information regarding new file(s) 610 that have been identified as likely containing confidential information from a number of clients. Rule generator 150 may use this information as training data for generating new policy rules and/or modifying existing policy rules, which may be referred to as updated policy rules 640.

In one implementation, software 330 may transmit updated policy rules 640 to other clients, via, e.g., policy server 130 or internal network 160 (block 465 of FIG. 4B). In another implementation, the results 630 of rule generator 150 may be sent to policy server 130. Policy server 130, in turn, may transmit updated policy rules 640 to all devices utilizing organizational network 180 (block 465 of FIG. 4B). For example, policy server 130 may provide updated policy rules 640 to a group of clients 110 attached to network 180 (e.g., clients associated with organization network 180).

File(s) 610 may be processed in accordance with the aspects of FIGS. 4C and 4D. For example, policy controller software 330 may detect a user attempting to transmit file(s) 610 (block 470 of FIGS. 4C and 4D); determine whether file(s) 610 is on the "blacklist" (block 475 of FIG. 4C); analyze file(s) 610 against the policy rules and/or updated policy rules (block 490 of FIG. 4D); and/or determine whether file(s) 610 violates the policy rules and/or updated policy rules (block 495 of FIG. 4D). Policy controller software 330 running on client 110 may determine (in accordance with blocks 480 and 485 of FIGS. 4C and 4D) whether to selectively permit transmission and/or permit transmission of file(s) 610 based upon the policy rules and/or updated policy rules (650).

CONCLUSION

Implementations consistent with the principles of the invention may relate to identifying and processing confidential information stored on network endpoints using one or more desktop search engine software packages. The search results may be used to prevent transmission of confidential information on a specific network endpoint, and to educate the network so to prevent other network endpoints from transmitting the same or similar confidential information.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 4A-4D, the order of the acts may differ in other implementations consistent with the principles of the invention. Also, non-dependent acts may be performed in parallel.

Although the identification of documents (e.g., files) created by the network endpoint was discussed, the principles of the invention may apply to content inadvertently stored on a network endpoint. For example, if a network endpoint inadvertently downloaded a virus via the Internet, the present invention may identify such a virus and block its distribution throughout the organizational network.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A system comprising:
a network device to:
generate a list of documents that violate a set of policy rules, the list of documents being generated based on previous searches of a client device performed by one or more search engines, of a plurality of search engines,
select a search engine, of the plurality of search engines, determined to be available,
cause the selected search engine to perform a search of the client device on a periodic basis, when an application is closed in the client device, and when the client device stops receiving information input by a user via the application, the search being performed based on a search term, the search term being inputted into the selected search engine, by the network device, based on the set of policy rules,
analyze search results output from the selected search engine against the set of policy rules,
identify search results that include confidential information based on analyzing the search results against the set of policy rules,
determine that the list of documents does not include one of the identified search results,
generate one or more new policy rules based on the list of documents not including the identified search results, and
transmit an updated set of policy rules to one or more other network devices, the updated set of policy rules including the one or more new policy rules.

2. The system of claim 1, where the network device is further to:
update the list of documents based on the identified search results that include confidential information.

3. The system of claim 1, where the network device is further to:
selectively permit transmission of a document included in the list of documents, and
permit transmission of a document not included in the list of documents.

4. The system of claim 1, where the network device is further to:
determine whether a document violates the updated set of policy rules,
selectively permit transmission of the document when the document violates the updated set of policy rules, and
permit transmission of the document when the document does not violate the updated set of policy rules.

5. The system of claim 1, where the network device is further to:
transmit the identified search results to an external device for formulating an updated set of policy rules for one or more other network devices of the system.

6. A network device comprising:
a processor to:
generate a list of documents that violate a set of policy rules, the list of documents being generated based on one or more previous searches of a client device;
select a search engine, of a client device, based on the search engine being determined to be available,
cause the selected search engine to perform a search, of memory devices of the client device on a periodic basis, when an application is closed in the client device, and when the client device stops receiving information input by a user via the application, the search being performed based on an inputted search term,
the search term being input into the selected search engine based on the set of policy rules,
identify a search result, of one or more search results output by the selected search engine, that includes confidential information, the search result being identified based on an analysis of the one or more search results against the set of policy rules,
determine that the list of documents does not include the identified search result,
generate one or more new policy rules based on the list of documents not including the identified search result, and
modify the set of policy rules to form a modified set of policy rules, the modified set of policy rules including the one or more new policy rules.

7. The network device of claim 6, where the processor is further to:
    update the list of documents based on the identified search result.
8. The network device of claim 6, where the processor is further to:
    transmit the modified set of policy rules to another network device.
9. The network device of claim 8, where the processor is further to:
    selectively permit transmission of a document included in the list of documents, and
    permit transmission of a document not included in the list of documents.
10. The network device of claim 8, where the processor is further to:
    determine whether a document violates the modified set of policy rules,
    selectively permit transmission of the document when the document violates the modified set of policy rules, and
    permit transmission of the document when the document does not violate the modified set of policy rules.
11. The network device of claim 6, where the processor is further to:
    transmit the modified set of policy rules to an external device.
12. A method comprising:
    generating, by a network device, a list of documents that violate a set of policy rules, the list of documents being generated based on previous searches of a client device performed by one or more of a plurality of search engines;
    causing, by the network device and by inputting a search term based on the set of policy rules, a search engine, of the plurality of search engines, to perform a search of a plurality of documents stored on the client device, the search engine being caused to perform the search on a periodic basis, when an application is closed in the client device, and when the client device stops receiving information input by a user via the application;
    analyzing, by the network device, search results output from the search engine against the set of policy rules, analyzing the search results including determining that the list of documents does not include at least one of the search results;
    determining, by the network device and in response to determining that the list of documents does not include the at least one of the search results, whether the plurality of documents includes confidential information based on analyzing the search results against the set of policy rules,
        a separate analysis of each document, of the plurality of documents, not causing at least one of the plurality of documents to be identified as including confidential information based on the analysis of the search results against the set of policy rules;
    generating, by the network device, one or more new policy rules when the plurality of documents includes the confidential information; and
    updating, based on generating the one or more new policy rules, the set of policy rules to formulate an updated set of policy rules, the updated set of policy rules including the one or more new policy rules.
13. The method of claim 12, where the separate analysis of each document, of the plurality of documents, would not cause any of the plurality of documents to be identified as including confidential information based on the analysis of the search results against the set of policy rules.
14. The method of claim 12, where the analyzing the search results output from the search engine against the set of policy rules further comprises:
    determining a level associated with the search results, and
    where determining that the plurality of documents includes the confidential information based on the analysis of the search results against the set of policy rules further comprises:
        comparing the determined level associated with the search results against a predetermined threshold.
15. The method of claim 12, further comprising:
    selectively preventing a transmission of each of the plurality of documents when the plurality of documents is determined to include the confidential information.
16. The method of claim 12, further comprising:
    updating the list of documents based on the determining that the plurality of documents includes the confidential information.

* * * * *